US011848766B2

(12) United States Patent
Sesha et al.

(10) Patent No.: US 11,848,766 B2
(45) Date of Patent: Dec. 19, 2023

(54) SESSION DETECTION AND INFERENCE

(71) Applicant: HEWLETT PACKARD ENTERPRISE DEVELOPMENT LP, Houston, TX (US)

(72) Inventors: Madhusoodhana Chari Sesha, Bangalore (IN); Yashas Bellur Yathish, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/515,422

(22) Filed: Oct. 30, 2021

(65) Prior Publication Data
US 2023/0136037 A1   May 4, 2023

(51) Int. Cl.
*H04L 67/141* (2022.01)
*H04L 9/40* (2022.01)
*H04L 43/08* (2022.01)
*H04L 43/16* (2022.01)

(52) U.S. Cl.
CPC ........... *H04L 67/141* (2013.01); *H04L 43/08* (2013.01); *H04L 43/16* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 2015/0355957 A1* | 12/2015 | Steiner | G06F 21/552 |
| | | | 714/37 |
| 2018/0262924 A1* | 9/2018 | Dao | H04W 24/08 |
| 2020/0285737 A1* | 9/2020 | Kraus | G06F 21/552 |
| 2021/0400063 A1* | 12/2021 | Tackabury | H04L 67/02 |

FOREIGN PATENT DOCUMENTS

| | | | | |
|---|---|---|---|---|
| WO | WO-2016082220 A1 * | 6/2016 | | H04N 21/234 |
| WO | WO-2018080898 A1 * | 5/2018 | | G06N 3/04 |

OTHER PUBLICATIONS

Yu, Y et al., "Session-Based Network Intrusion Detection Using a Deep Learning Architecture," Sep. 13, 2017, Conference paper, https://link.springer.com/chapter/10.1007/978-3-319-67422-3_13.
Owasp.org, "Session Hijacking Attack," Retrieved online Oct. 10, 2021, https://owasp.org/www-community/attacks/Session_hijacking_attack.

(Continued)

*Primary Examiner* — Schquita D Goodwin
*Assistant Examiner* — Ishrat Rashid
(74) *Attorney, Agent, or Firm* — Sheppard Mullin Richter & Hampton LLP

(57) ABSTRACT

Sessions are core components of communication between communicating systems, which may include, for example, a client device and a server. A network device can be used to monitor and analyze session information that is transmitted in a client-server communication. Visibility into the session information and the traffic flow of a network device is critical to improve the performance and security of the network device and the transmission of information in the client-server communication. A lack of visibility into the session information can reduce security, leading to viruses, malware, and malfunctions.

5 Claims, 6 Drawing Sheets

(56) References Cited

OTHER PUBLICATIONS

Conran, M., "Load Balancing and Scale-Out Architectures," Feb. 25, 2015, https://network-insight.net/2015/02/26/load-balancing-and-scale-out-architectures/.

Tcpreplay, "Sample Captures," Retrieved online Sep. 23, 2021, https://tcpreplay.appneta.com/wiki/captures.html.

Cisco, "Cisco IOS NetFlow," Retrieved online Aug. 29, 2021, https://www.cisco.com/c/en/US/products/ios-nx-os-software/ios-netflow/index.html.

Wikipedia.org, "NetFlow and IPFIX," Retrieved online Oct. 1, 2021, https://en.wikipedia.org/wiki/NetFlow#NetFlow_and_IPFIX.

\* cited by examiner

SESSION DETECTION AND INFERENCE

BACKGROUND

A session is a temporary and interactive information interchange between two or more systems. Some sessions involve a client and a server, while other sessions involve two or more communicating devices. A common type of client/server session is a Web or HTTP session. A communication session may involve more than one message in each direction. During a session, at least one of the communicating parties needs to hold current state information and save information about the session history to be able to communicate. A session needs to be established in connection-oriented communications before data can be transferred between systems.

However, security between parties participating in a session may be compromised. For example, a third party may hijack or otherwise access identification information of a session, such as cookies. One method of accessing such identification information includes source-routed internet protocol (IP) packets, in which IP packets between two parties are diverted to a machine of the third party. Another method is that the third party eavesdrops a communication between the two parties. Yet another method is that the third party pretends to be one of the two parties and sends commands to gain access to a communication between the two parties.

BRIEF DESCRIPTION OF THE DRAWINGS

The present disclosure, in accordance with one or more various examples, is described in detail with reference to the following figures. The figures are provided for purposes of illustration only and merely depict typical or exemplary examples.

Figure 1:
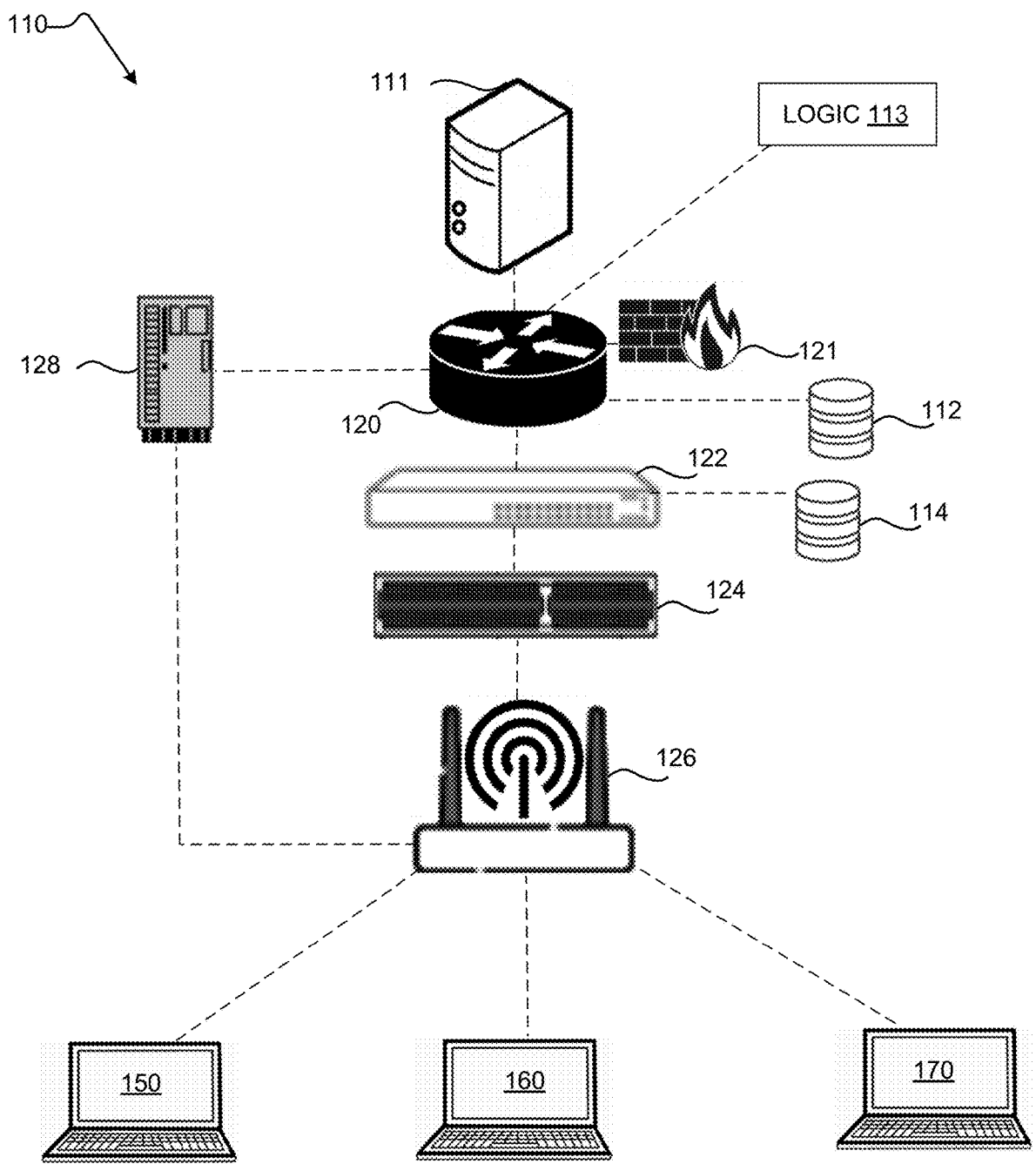
FIG. 1 is an exemplary illustration of a computing system that authenticates and authorizes client devices to access a network in a streamlined manner, according to examples described in the present disclosure.

The figures are not exhaustive and do not limit the present disclosure to the precise form disclosed.

DETAILED DESCRIPTION

Sessions are core components of communication between communicating systems, which may include, for example, a client device and a server. A session is established at a certain point in time and it ends at a later point in time. A session may begin when a user logs in or accesses a computer system, network, or software service. A session may end when the user logs out of the service, leaves the network, or turns off the computer system. An established communication session may involve more than one message being sent in each direction. During a session, session information related to activities of the user may be stored. The stored session information may be used to retrieve or view data from various computing systems. Visibility into the session information and the traffic flow of a network device in a client-server communication is critical to improve the performance and security of the network device by allowing the management of the session information and traffic flow. A lack of visibility into the session information and traffic flow reduces the security of the network device and applications, making the network device or application vulnerable to various session based attacks. Currently, tools exist to manage sessions at either the client or server side, but little visibility is available into the session information in the network device. As such, there is a need for visibility into the session information and traffic flow of a network device in a client-server communication.

To address this need for visibility into session information and traffic flow, a solution is to bring in intelligence of session detection and session analysis into the network device in a client-server communication. The session detection and session analysis may be used to keep track of sequence numbers by using Transmission Control Protocol (TCP) header information of each message being sent within the client-server communication. This solution may also use the session detection and analysis information to generate statistical information regarding the sessions occurring within a client-server communication, such as a frequency of sessions and a mean session duration of the sessions. The system may adaptively collect data of session information while performing load balancing with or without external intervention.

Described herein are solutions that address the problems described above. A computing system may provide a systematic way of obtaining and managing session information at a network device. In various examples, the computing system can comprise a network device in a client-server communication. In some examples, the client and/or servers can be the internet. In some cases, the client and/or servers can be a computing device, which may comprise, for example, a computer or a mobile device. In some examples, the network device can be a switch, an access point, or a router. The network device, in some examples, can be involved in a plurality of different client-server communications on which a plurality of sessions can occur simultaneously. Upon detection of a session in a client-server communication, the network device can send instructions to obtain session information without disrupting the user activities conducted during the session. In this way, the network device can monitor, analyze, and manage the various session information and traffic flow of data in client-server communications. In some examples, the network device can monitor the session information and traffic flow by sending instructions, and perform load balancing on the session information to increase the performance of the transmission of information and decrease the traffic flow of information in a client-server communication. Monitoring and analyzing the session information in the client-server communications can prevent malfunctions and malware from occurring by flagging any issues and implementing a solution as soon as an issue occurs, thereby proactively preventing breaches and compromises of security. These and other features of the examples of the present disclosure are discussed herein.

FIG. 1 is an exemplary illustration of computing system 110 including one or more computing components that may encompass any of a server 111, a router 120, a switch 122, a network controller 124, an access point 126, and a DHCP server 128. In some examples, the router 120 may be associated with a firewall 121. The server 111 may include a Remote Authentication Dial-In User Service (RADIUS) server or an authentication server in some examples. The router 120 may further include or be associated with a database or cache 112 (hereinafter "database") which stores attributes of particular client devices, servers, and access control lists or policies associated with client devices, such as client devices 150, 160, and 170, which connect to a network via the access point 126. Although only three client devices are illustrated in FIG. 1, any number of client devices may be connected via the access point 126. The database 112 may be integrated or embedded within the router 120 or spatially separated from the router 120. The access control lists may be stored as files and/or may be indexed. In some examples, the access control lists or policies may include particular access levels and/or access privileges to be assigned to each client device depending on a group or classification that the client device belongs to. For example, the access privileges may indicate a subset (e.g., a portion or all) of data resources, such as particular data servers, databases, platforms, objects, file directories, or files that each client device is authorized to access, particular protocols (e.g., Hypertext Transfer Protocol (HTTP) or File Transfer Protocol (FTP)) that each client device may utilize to access data resources, a transmission speed or rate to be provided to each of the client devices, one or more Vendor Specific Attributes (VSA), and/or a particular VLAN to be assigned to each client device. In some examples, the VSA may include bandwidth on incoming and/or outgoing traffic, and download and/or upload speeds. The access control lists or policies may be stored in the database 112 of the router 120, rather than at other computing components such as the server 111, so that the router 120 may centrally update the access control lists or policies and propagate any updates to other computing components in the network. In some examples, the switch 122 may include or be associated with a database 114. In some examples, the database 114 may include any or all of the information previously described with respect to the database 112. Alternatively or additionally, the database 114 may include information of different virtual local area networks (VLANs) and pertaining to routing traffic between the different VLANs. The database 114 may be integrated or embedded within the switch 122 or spatially separated from the switch 122.

Each of the computing components may include one or more hardware processors and logic that implements instructions to carry out the functions of the computing components. In particular, the router 120 may include or be associated with logic 113. The logic 113 may receive one or more authentication packets transmitted by a client device via the network controller 124. In some examples, the network controller 124 may include a wireless local area network (WLAN) controller or an access point that manages a WLAN network, which may be applicable in relatively small WLAN networks The logic 113 may verify credentials of the client device. The logic 113 may then decipher or extract one or more attributes from the authentication packets, including a media access control (MAC) address of the client device, one or more hardware attributes such as a type of client device (e.g., tablet, desktop computer, IoT device), and/or one or more software attributes of the client device.

Figure 2:
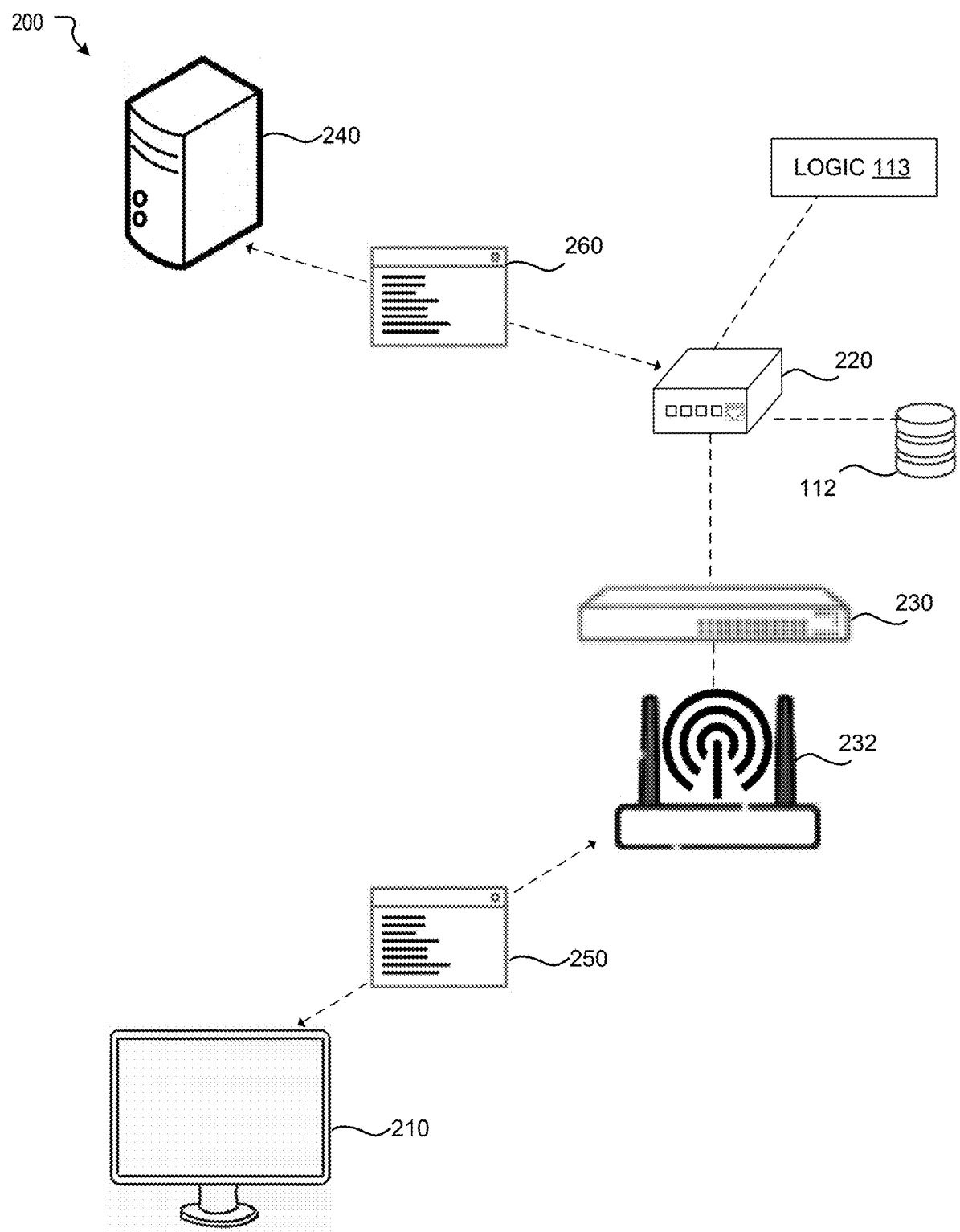
FIG. 2 is an exemplary illustration of an example session operation in accordance with various examples of the present disclosure.

FIG. 2 is an example illustration of an example session operation 200 in accordance with various examples of the present disclosure. In some examples, a network of the session operation 200 can comprise one or more computing components that may encompass any of a client device 210, a network device 220, a network controller 230, an access point 232, and a server 240. FIG. 2 elaborates on specific components of FIG. 1 while elucidating an exchange of information among the components. The client device can be a computing device, such as a computer, a mobile phone, a tablet device, etc. The network device 220 may be implemented as the router 120 or switch 122 of FIG. 1. The network device 220 can be a router or a switch, that is configured to connect various computing components in a network, such as the client device 210, the network controller 230, the access point 232, and the server 240. The network device 220 may further include or be associated with a database or cache 222 (hereinafter "database") which stores attributes of particular client devices, servers, and access control lists or policies associated with the client device 210, which connect to a network via the access point 232. In some examples, the client device 210 can access the internet, wirelessly, through Wi-Fi (e.g., IEEE 802.11), Bluetooth (e.g., IEEE 802,15,1), or cellular connection (e.g., long-term evolution, $5^{th}$ generation cellular networks, etc.) to wirelessly access the server 240 through the network device 220. The server 240 can implement software and/or hardware, such as web servers, application server, communications server, database server, etc. The server 240 can access the internet through Wi-Fi, Bluetooth, phone line, or LAN/WLAN network interface. In other examples, the network device 240 can be an enterprise intranet (e.g., a private network) and the client device 210 can access the enterprise intranet, wirelessly, through the network device 220 to access data files or other enterprise data. In some cases, the network device 220 can be a network link (e.g., Wi-Fi, Ethernet port, router, switch, etc.) that allows a plurality of computing components to communicate with each other. The network controller 230 and the access point 232 can be configured to allow computing components in a network such as the client device 210 and the server 240 to connect through the network device 220. In this example, the network device 220 can establish a client-server communication between the client device 210 and the server 240.

In some examples, a session operation 200 can begin when the client device 210 is turned on, logged into, or accessed. In some examples, a session operation 200 can end when the client device 210 is turned off, logged out of, or is no longer being accessed. During the session operation 200, the client device 210 can establish a client-server communication with the server 240. The network device 220 can be configured to act as a link to establish the client-server communication between the client device 210 and the server 240. In some examples, the client device 210 can send request information 250 to the server 240 through the network device 220. The server 240 can then send response information 260 back to the client device 210 through the network device 220. The network device 220 can act as the link to establish a client-server communication and allow information to be sent back and forth between the client device 210 and the server 240 during the session operation 200. In some examples, the request information 250 of the session operation 200 can be information sought from browsing the Internet, an email sent through various email clients, searching for files stored in a database, etc. The response information 260 of the session operation 200 can be information found on the Internet, a response email sent through various email clients, files requested from a database, etc. In some examples, the request information 250 and the response information 260 can comprise session information related to the activities performed at the client device 210 and the server 240 during the session operation 200. In some examples, the network device 220 can read and obtain session information from the request information 250 and response information 260 passing through during the session operation 200. Once the network device 220 has read and obtained the session information of the request information 250 and response information 260, the network device 220 may record and store the session information into the database 112. The session information can comprise source information, destination information, source port, destination port, duration of the session operation 200, and/or parameters such as lengths of frames or size of packets transmitted, number of frames or number of frames transmitted, variance in sizes of frames or packets, and/or variance in lengths of frames or packets, frequency of packets, and frequency of frames transmitted during the session. Allowing the session information to be stored at the network device 220 can allow visibility into the performance, security, and traffic flow of data in the client-server communication. In a particular scenario, two parties may have an established pattern of communication, in which lengths of frames transmitted generally fall within a particular range. However, if the lengths of frames deviate from that particular range, then such a deviation may signify interference or interception by a malicious actor. Analyzing the stored session information may detect anomalous behavior by comparing any of the aforementioned parameters or other session information to respective thresholds, ranges, or standards (hereinafter "thresholds"). For example, anomalous behavior may constitute any of the aforementioned parameters or other session information falling outside of respective thresholds or standards. When anomalous behavior is detected by the network device 220, the network device 220 may collect additional session information. In some examples, the network device 220 may collect additional session information specifically regarding the parameters or other session information that fall outside of respective thresholds or standards. For example, if the lengths of the transmitted frames deviate from a particular range, then the network device may collect additional session information particularly regarding the lengths of the transmitted frames, without collecting other information.

Additionally or alternatively, when anomalous behavior is detected, the network device 220 may send alerts to an administrator to provide notification of the anomalous behavior. The administrator may provide feedback in response to the alerts to resolve the anomalous behavior. For example, if the administrator receives an alert regarding a congestion of traffic flow data in the client-server communication, then the administrator may send a feedback to the network device to perform load balancing. For example, the network device 220 may perform load balancing based on the feedback. In particular, the feedback may indicate that traffic flow transmission (e.g., frames or packets) across one session or a subset of the sessions may be staggered, postponed, or delayed, and/or is of lower or higher priority compared to one or more other sessions. In other scenarios, the feedback may indicate that transmission of a subset or portion of traffic in one session may be postponed, or delayed, and/or is of lower or higher priority compared to one or more other subsets or portions of the traffic in that one session. Thus, the network device 220 may perform load balancing in accordance with the feedback indicating priorities of the sessions. The load balancing may comprise staggering a transmission of frames or packets within sessions such that at any given interval of time, a total amount of traffic transmitted across all the session is within a threshold amount of traffic. If one session is indicated to have a lower priority, the network device 220 may delay transmission of that one session, in order to load balance. Additionally, or alternatively, the network device 220 may postpone or delay transmission of a portion of traffic in one session according to the feedback. The network device 220 may stagger a transmission of frames or packets within sessions such that at any given interval of time, a total amount of traffic transmitted across all sessions is within a threshold amount of traffic any given interval of time. Thus, transmission of frames or packets within a particular session or particular sessions, or transmission of a subset of frames or packets within a particular session or particular sessions, may be postponed or delayed. As only an illustrative example, a threshold amount of traffic may be 1000 megabytes (MB) per 5 second interval. Thus, in such a scenario, the network device 220 may regulate an amount of total traffic transmitted across all sessions to be no more than 100 MB per 5 second interval by selectively delaying or postponing transmission of frames or packets within a particular session or particular sessions, or transmission of a subset of frames or packets within a particular session or particular sessions. Additionally, or alternatively, the network device 220 may perform all of the above with or without human interaction. For example, the administrator is not necessary to resolve the anomalous behavior and the network device may automatically perform load balancing based on any or all session information that is collected and/or stored.

Figure 3:
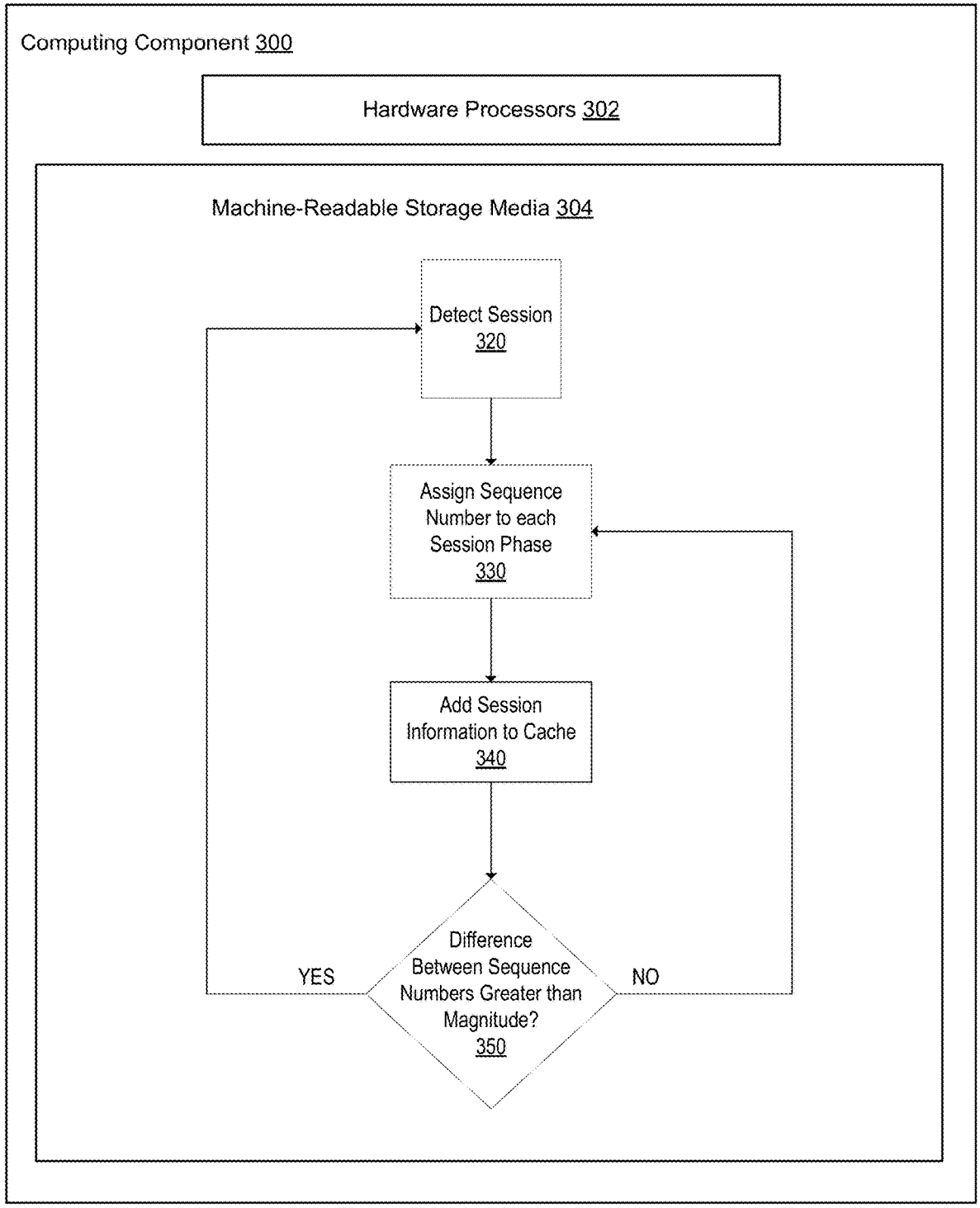
FIG. 3 is an exemplary flowchart, illustrating how a session is detected in a client-server communication and sequence numbers are assigned to each phase of a session in accordance with various examples of the present disclosure.

FIG. 3 illustrates a computing component 300 that includes one or more hardware processors 302 and machine-readable storage media 304 storing a set of machine-readable/machine-executable instructions that, when executed, cause the hardware processor(s) 302 to perform an illustrative method of reducing computing costs while maintaining network services and performance. It should be appreciated that there can be additional, fewer, or alternative steps performed in similar or alternative orders, or in parallel, within the scope of the various examples discussed herein unless otherwise stated. The computing component 300 may be implemented as the router 120 or switch 122 of FIG. 1, and network device 220 of FIG. 2. FIG. 3 summarizes and further elaborates on some aspects previously described.

At step 320, the hardware processor(s) 302 may execute machine-readable/machine-executable instructions stored in the machine-readable storage media 304 to detect a session in a client-server communication. A client-server communication is first established before a session can be detected. A first session is detected and established when a first message is sent within the client-server communication. In some examples, the session can be a Transmission Control Protocol (TCP) session. In some examples, the client-server communication is a communication between a client device and a server using a network device as a link. Once the first session is established, each message sent in the client-server communication can be represented as a session phase. A message can be a request sent by the client device or a response sent by the server in a client-server communication. Each session may include one or more session phases. In some examples, a session operation can include a plurality of sessions, with each session comprising a plurality of sessions phases. In some examples, a single message can be a request sent by the client device or a response sent from the server.

At step 330, the hardware processor(s) 302 may execute machine-readable/machine-executable instructions stored in the machine-readable storage media 304 to assign a sequence number to each session phase of a session operation. In some examples, a first session phase of a first session is assigned an initial sequence number (ISN). In some examples, the ISN is a 32 bit number. In some examples, the ISN is a random number. The ISN is the first sequence number assigned to the first session phase of the session operation. In some examples, each subsequent session phase of the session operation will have a sequence number that is incremental to the sequence number of the previous session phase. The amount in which each subsequent sequence number will increment from the previous sequence number may vary according to various factors.

At step 340, the hardware processor(s) 302 may execute machine-readable/machine-executable instructions stored in the machine-readable storage media 304 to add session information of each session phase of the session operation to a cache. In some examples, the network device reads a plurality of session information of a plurality of session phases in the session operation and records the plurality of session information in the cache. The cache may be a database associated with or embedded in the network device used to establish the client-server communication. In some examples, the cache of session information can be shown in TABLE 1. The session information of each session phase can comprise of a sequence number, a time duration, source information, destination information, source port, destination port, and a length of the frame of the session information of a session phase of the session operation. The cache of session information can display a list of session information for each session phase that has been established in a single session operation. The first set of session information listed in the cache will the from the first session phase of the session operation, wherein the sequence number is the ISN. Each subsequent session phase listed in the cache will have an incremented sequence number from the previous session phase. The cache may store a plurality of session information of a plurality of session phases of the session operation.

At step 350, the hardware processor(s) 302 may execute machine-readable/machine-executable instructions stored in the machine-readable storage media 304 to determine if the difference between sequence numbers of a current session phase and a previous session phase is greater than a preset magnitude. In some examples, if the difference between the sequence number of the current message or session phase and the sequence number of the previous message or session phase in the current session is greater than a preset magnitude, then the current session has ended and a new session is established in the client-server communication. For example, if the preset magnitude is 1000, the sequence number of the current session phase is 2227 and the sequence number of the previous session phase is 1109, then the difference in sequence numbers is 1118, which is greater than the magnitude of 1000, so the current session has ended and a new session is being established. If the difference between the sequence number of the current message and the sequence number of the previous message in the current session is not greater than the preset magnitude, then the current session continues to be active. In some examples, the preset magnitude can be a preset number. In other examples, the preset magnitude can vary periodically or based on various factors. Many variations are possible. If the difference between the sequence number of the current message or session phase and the sequence number of the previous message or session phase in the current session is determined to be greater than the preset magnitude, then the hardware processors 302 may proceed to step 320, in which a new session commences. Otherwise, the hardware processors 302 may proceed to step 330, in which the current session is continuing but at a different session phase or message. Subsequently, the hardware processors may obtain a subsequent entries of session phases during the session operation and repeat the aforementioned steps for each of the subsequent entries, until the session operation has ended.

Figure 4:
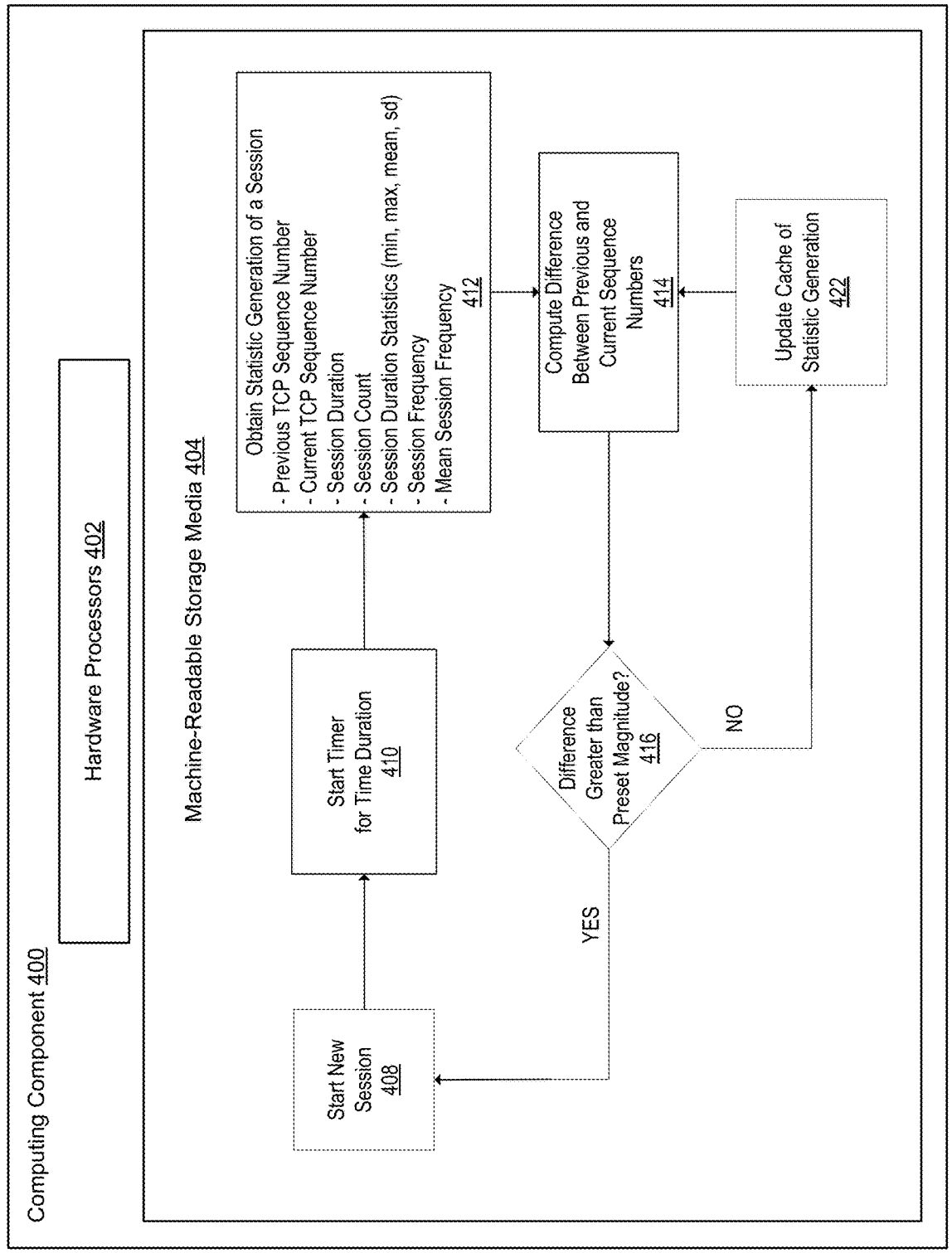
FIG. 4 is an exemplary flowchart, illustrating how a new session is established in a client-server communication in accordance with various examples of the present disclosure.

FIG. 4 illustrates a computing component 400 that includes one or more hardware processors 402 and machine-readable storage media 404 storing a set of machine-readable/machine-executable instructions that, when executed, cause the hardware processor(s) 402 to perform an illustrative method of reducing computing costs while maintaining network services and performance. It should be appreciated that there can be additional, fewer, or alternative steps performed in similar or alternative orders, or in parallel, within the scope of the various examples discussed herein unless otherwise stated. The computing component 400 may be implemented as the router 120 or switch 122 of FIG. 1, network device 220 of FIG. 2, and computing component 300 of FIG. 3. FIG. 4 summarizes and further elaborates on some aspects previously described.

At step 408, the hardware processor(s) 402 may execute machine-readable/machine-executable instructions stored in the machine-readable storage media 404 to start a new session in a client-server communication. A client-server communication is first established before a session can be detected. A first session is detected and established when a first message is sent within the client-server communication. In some examples, the session can be a Transmission Control Protocol (TCP) session. In some examples, the client-server communication is a communication between a client device and a server using a network device as a link. In some examples, the network device can be a router or a switch. Once the first session is established, each message sent in the client-server communication can be represented as a session phase. In some examples, the first session is one or more messages sent between the client device and the server. In some examples, the one or more messages can be one or more requests sent by the client device, one or more responses sent from the server, or a combination of one or more requests and responses. Each session may comprise of one or more session phases. In some examples, a session operation can comprise of a plurality of sessions, with each session comprising a plurality of sessions phases. In some examples, a single message can be a request sent by the client device or a response sent from the server. In some examples, the network device can be a router or a switch. In some examples, the first session is one or more messages sent between the client device and the server. In some examples, the one or more messages can be one requests sent by the client device, one or more responses sent from the server, or a combination of one or more requests and responses. In some examples, each message sent between the client device and the server has a sequence number. In some examples, the sequence number is a 32 bit number. In some examples, the sequence number is a random number. Many variations are possible. In some examples, each message sent in the client-server communication of the first session has a sequence number. The sequence number of a current message sent in the client-server communication is an increment of the sequence number of the previous message sent. If the difference between the sequence number of the current message and the sequence number of the previous message in the first session is greater than a preset magnitude, then the first session has ended and a new session is established for the client-server communication. If the difference between the sequence number of the current message and the sequence number of the previous message in the first session is not greater than the preset magnitude, then the first session continues to be active and remains the current session.

At step 410, the hardware processor(s) 402 may execute machine-readable/machine-executable instructions stored in the machine-readable storage media 404 to start a timer for the new session. In some examples, the timer can provide the start time of the new session. For example, the new session can be a first session and the timer can provide a start time of 9:36:00 in which the first session was established in a communication between a client device and a server. In some examples, the timer may provide a current time of the current session. In some examples, the current time of the current session is the time of the new message sent in the client-server communication. For example, if the current session is the first session, then the timer can provide a current time of 10:21:00 where a new message was sent in the client-server communication. A time duration of the current session may be determined. The time duration of the current session can be the difference between the current time and the start time of the current session. For example, the time duration for the first session can be the difference of the current time of 10:21:00 and the start time of 9:36:00, which is 45 minutes. In some examples, the time duration is updated with every new message sent in the first session of the client-server communication. In some examples, the time duration of each message sent in the first session between the client device and the server can be based on the session information of the message.

At step 412, the hardware processor(s) 402 may execute machine-readable/machine-executable instructions stored in the machine-readable storage media 404 to obtain statistic generation information of the session. In some examples, the statistic generation information is obtained along with the session information of a current session phase. The statistic generation information and the session information can be obtained at a network device. The network device can be a router or a switch. In other examples, the statistic generation information is based on a plurality of session information of a plurality of session phases. In some examples, the statistic generation information can comprise a session number, a sequence number, a session start time, a session time duration, a session count, a mean duration, a minimum duration, a maximum duration, a standard deviation of durations, a frequency of sessions, and a session type, as shown in TABLE 2. In some examples, the session type can comprise a short-lived session or a long-lived session. In some examples, the long-lived session is any session with a time duration greater than a preset duration threshold. The short-lived session is any session with a time duration not greater than the preset duration threshold. In some examples, the preset duration threshold can be a preset number. In other examples, the preset duration threshold can vary periodically or based on various factors. Many variations are possible. The statistic generation information may be stored in a cache or database ("database") associated with or embedded into the network device. The database may store session information of each session phase.

At step 414, the hardware processor(s) 402 may execute machine-readable/machine-executable instructions stored in the machine-readable storage media 404 to compute a difference between the sequence number of the current message, or session phase, and the sequence number of the previous message, or previous session phase, in the current session. The stored session information of session phases in a cache or database may be analyzed or computed to determine a difference between the sequence number of the current session phase of the session operation and the sequence number of the previous session phase of the session operation. In some examples, if the current session phase is the first session phase of the session operation, then the difference will be zero (0) since there is no previous session phase. In some examples, if the difference between the sequence number of the current session phase and the sequence number of the previous session phase is more than a preset magnitude, then the current session phase is in a new session number. The new session number will be an increment number of one (1) more than the session number of the previous session phase. For example, if the preset magnitude is 100 and the difference between the sequence number of the current session phase and the sequence number of the previous session phase is 200, if the previous session phase is in session number 5, then the current session phase is in session number 6. Many variations are possible. In some examples, if the difference between the sequence number of the current session phase and the sequence number of the previous session phase is less than a preset magnitude, then the current session phase is in the same session number. For example, if the preset magnitude is 500 and the difference between the sequence number of the current session phase and the sequence number of the previous session phase is 499, if the previous session phase is in session number 12, then the current session phase is in session number 12. In some examples, the first session phase of a session operation will be in session number 1. Many variations are possible.

At step 416, the hardware processor(s) 402 may execute machine-readable/machine-executable instructions stored in the machine-readable storage media 404 to determine if the difference between sequence numbers of a current session phase and a previous session phase is greater than a preset magnitude. In some examples, if the difference between the sequence number of the current message or session phase and the sequence number of the previous message or session phase in the current session is greater than a preset magnitude, then the current session has ended and a new session is established in the client-server communication. For example, if the preset magnitude is 1000, the sequence number of the current session phase is 2227 and the sequence number of the previous session phase is 1109, then the difference in sequence numbers is 1118, which is greater than the magnitude of 1000, so the current session has ended and a new session is being established. If the difference between the sequence number of the current message and the sequence number of the previous message in the current session is not greater than the preset magnitude, then the current session continues to be active. In some examples, the preset magnitude can be a preset number. In other examples, the preset magnitude can vary periodically or based on various factors. Many variations are possible.

In some examples, when the difference between the sequence number of the current message and the sequence number of the previous message in the current session is greater than the preset magnitude, the timer produces an end time of the current session. The time duration of the current session can be a difference between the end time and the start time of the current session. Subsequently, the hardware processors will repeat the aforementioned steps for each of the new sessions, until analysis of all sessions have been completed. The new session may start when a subsequent message is sent between the client device and the server in the client-server communication.

At step 422, the hardware processor(s) 402 may execute machine-readable/machine-executable instructions stored in the machine-readable storage media 404 to update the cache or database with the session information and statistic generation information of the new session phase of the current session. In some examples, when the difference between the sequence number of the current message and the sequence number of the previous message in the current session is not greater than the preset magnitude, the current session will continue. When a subsequent message is sent in the client-server communication, the network device may obtain the session information and statistic generation information of the new message or session phase.

In response to the network device obtaining the session information and the statistic generation information of the new session phase of the current session, the network device may store or update the cache with the session information and statistic generation information from the new session phase of the current session.

TABLE 1 illustrates an example table of session detection information visible in a network device during a session operation in progress in accordance with various examples of the present disclosure. In TABLE 1, the ISN of the first session phase of the session operation is 13601. The session information of the first session phase may comprise a time duration (7.744747 seconds) of the first session phase, the source information (96.43.146.176) and the source port (443) from which the message of the first session phase is being sent from, the destination information (172.16.133.82) and destination port (61228) from which the message of the first session phase is being sent to, the length of frame (1414) of the session information of the first session phase, the difference (0) between the sequence number of the current session phase and the sequence number of the previous session phase, and the session number (1) that the first session phase is in. In TABLE 1, the preset magnitude is set to 10000, making all session phases of the session operation in session number 1 since the difference in sequence numbers for all session phases of the session operation is below 10000.

TABLE 1

| Sequence Number | Time (in Seconds) | Source | Destination | Source Port | Destination Port | Length of Frame | Difference is Sequence Numbers | Session Number |
| --- | --- | --- | --- | --- | --- | --- | --- | --- |
| 13601 | 7.744747 | 96.43.146.176 | 172.16.133.82 | 443 | 61228 | 1414 | 0 | 1 |
| 14961 | 7.745896 | 96.43.146.176 | 172.16.133.82 | 443 | 61228 | 1414 | 1360 | 1 |
| 17681 | 7.746999 | 96.43.146.176 | 172.16.133.82 | 443 | 61228 | 1414 | 2720 | 1 |
| 19041 | 7.747147 | 96.43.146.176 | 172.16.133.82 | 443 | 61228 | 1414 | 1360 | 1 |
| 25073 | 15.445882 | 96.43.146.176 | 172.16.133.82 | 443 | 61228 | 60 | 6032 | 1 |
| 25073 | 15.446856 | 96.43.146.176 | 172.16.133.82 | 443 | 61228 | 60 | 0 | 1 |
| 25073 | 15.486479 | 96.43.146.176 | 172.16.133.82 | 443 | 61228 | 1414 | 0 | 1 |
| 27793 | 15.487578 | 96.43.146.176 | 172.16.133.82 | 443 | 61228 | 1414 | 2720 | 1 |
| 29195 | 15.487963 | 96.43.146.176 | 172.16.133.82 | 443 | 61228 | 1414 | 1402 | 1 |
| 31222 | 23.410784 | 96.43.146.176 | 172.16.133.82 | 443 | 61228 | 60 | 2027 | 1 |

The session operation of the client-server communication can comprise of a plurality of sessions, wherein each session has its own statistic generation information. For example, the updated statistic generation information of the first session will comprise of the session number, an updated sequence number of the subsequent message, the session start time, an updated session time duration, the session count, an updated mean duration, an updated minimum duration, an updated maximum duration, an updated standard deviation of durations, an updated frequency of sessions, and the type categorization of session based on whether the updated session time duration is greater than the preset duration threshold. Each type of categorization of a session may be labeled as a particular group of the sessions. The type of categorization may be, for example, a time of day, a device used to access the session, an application used to access the session, the duration of the session, etc. In some examples, the updated statistic generation information may be different from the previous statistic generation information. In other examples, the updated statistic generation information may be exactly the same as the previous statistic generation information. Many variations are possible.

The cache of statistic generation information of the session operation can be read by the network device. In some examples, the network device can be a router or a switch. The network device can be monitored by an administrator. The administrator may provide the network device with feedback based on the statistic generation information stored in the cache.

TABLE 2 illustrates an example table of session information obtained during an operation of session detection in accordance with various examples of the present disclosure. In TABLE 2, session number 1 has a session start time of 10:30:00, a session time duration of 30 minutes, a session count of 1, a mean duration of 30, a minimum duration of 30, and a maximum duration of 30. The frequency of short-lived sessions is based on the number of short-lived sessions that occur within a 30 minute window. The frequency of short-lived sessions for session number 1 is 1. The preset duration threshold is 120 minutes, which categorizes session number 1 a short-lived type session, as the session time duration of session number 1 is 30 minutes which is not greater than 120 minutes. Session number 2 has a session start time of 11:45:00, a session time duration of 45 minutes, a session count of 2, a mean duration of 37.5, a minimum duration of 30, a maximum duration of 45, a standard deviation of durations of 7.50, and a frequency of short-lived sessions of 0.8. The session number 2 is categorized as a short-lived type session since its session time duration is less than the preset duration threshold of 120 minutes. The mean duration, minimum duration, maximum duration, standard deviation of durations and frequency of short-lived sessions of session number 2 is based on the statistical generation information of the first session and the second session. A short-lived type session may be one of various categorized groups of sessions.

TABLE 2

| Session Number | Session Start Time | Time Duration T (in Mins) | Session Count | Type of Session (Short-Lived or Long-Lived)(Long-Lived = 120 mins) | Mean Duration | Minimum Duration | Maximum Duration | Standard Deviation | Frequency of Short-Lived Sessions (Tirse Window taken is 30 mins) |
|---|---|---|---|---|---|---|---|---|---|
| 1 | 10.30.00 | 30 | 1 | Short-Lived | 30 | 30 | 30 | 0 | 1 |
| 2 | 11.45.00 | 45 | 2 | Short-Lived | 37.5 | 30 | 45 | 7.50 | 0.8 |
| 3 | 13.50.00 | 90 | 3 | Short-Lived | 55 | 30 | 90 | 25.50 | 0.3 |
| 4 | 15.40.00 | 50 | 4 | Short-Lived | 53.75 | 30 | 90 | 22.19 | 0.32 |
| 5 | 17.20.00 | 100 | 5 | Short-Lived | 63 | 30 | 100 | 23.13 | 0.29 |

Figure 5:
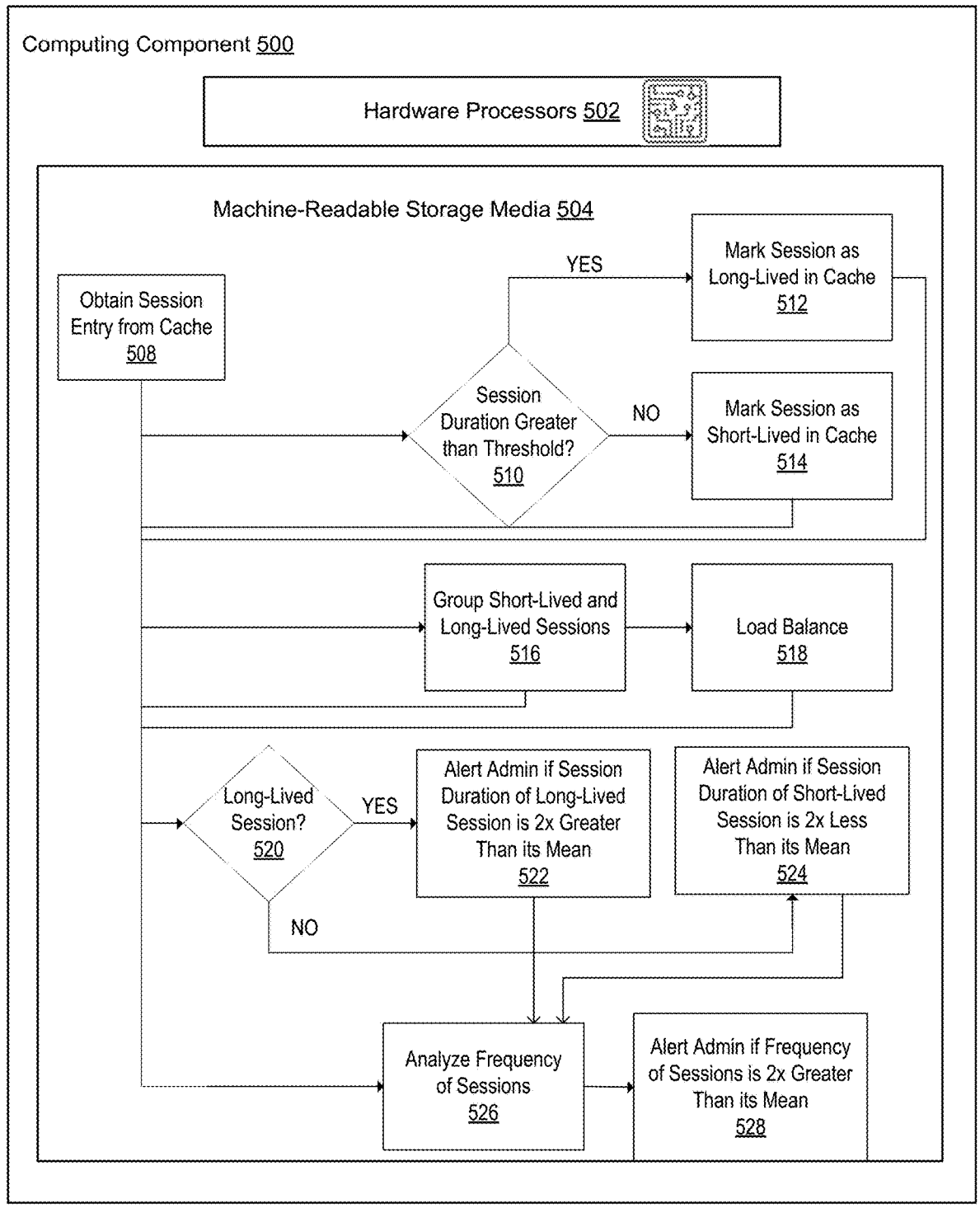
FIG. 5 is an exemplary flowchart, illustrating how a session is categorized based on the statistics generation information of the session information in accordance with various examples of the present disclosure.

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of reducing computing costs while maintaining network services and performance. It should be appreciated that there can be additional, fewer, or alternative steps performed in similar or alternative orders, or in parallel, within the scope of the various examples discussed herein unless otherwise stated. The computing component 500 may be implemented as the router 120 or switch 122 of FIG. 1, network device 220 of FIG. 2, computing component 300 of FIG. 3, and computing component 400 of FIG. 4. FIG. 5 summarizes and further elaborates on some aspects previously described.

At step 508, the hardware processor(s) 502 may execute machine-readable/machine-executable instructions stored in the machine-readable storage media 504 for a network device to obtain session information and statistic generation information of a session from the cache. In some examples, the statistic generation information of one or more sessions of the session operation can be read and obtained by the network device from the cache. In some examples, the network device can be a router or a switch. The network device can be monitored by an administrator. In some examples, the administrator can provide feedback to the network device based on the statistic generation information.

At step 510, the hardware processor(s) 502 may execute machine-readable/machine-executable instructions stored in the machine-readable storage media 504 to determine if the session has statistic generation information with a session time duration that is greater than a preset duration threshold. In some examples, the preset duration threshold can be a preset number. In other examples, the preset duration threshold can vary periodically or based on various factors. Many variations are possible.

At step 512, the hardware processor(s) 502 may execute machine-readable/machine-executable instructions stored in the machine-readable storage media 504 to categorize the session as a long-lived session type in the cache. By determining that the statistic generation information of the session comprises a session time duration that is greater than the preset duration threshold, the cache may update the statistic generation information of the session to have a categorization type of long-lived session. A long-lived session may be one of various groups of session categories.

At step 514, the hardware processor(s) 502 may execute machine-readable/machine-executable instructions stored in the machine-readable storage media 504 to categorize the session as a short-lived session type in the cache. By determining that the statistic generation information of the session comprises a session time duration that is not greater than the preset duration threshold, the cache may update the statistic generation information of the session to have a categorization type of short-lived session. A short-lived session may be one of various groups of session categories.

At step 516, the hardware processor(s) 502 may execute machine-readable/machine-executable instructions stored in the machine-readable storage media 504 to group the long-lived session types together and group the short-lived session types together. Once every session stored in the cache of a session operation has been categorized as either a long-lived or short-lived session type based on their statistic generation information, all of the long-lived session types are grouped together and all of the short-lived session types are grouped together. A long-lived session and a short-lived session may be two of various different groups of session categories.

At step 518, the hardware processor(s) 502 may execute machine-readable/machine-executable instructions stored in the machine-readable storage media 504 to perform load balancing on data being transferred in the client-server communication during the session operation. Once every session stored in the cache of a session operation has been categorized as either a long-lived session or a short-lived session, the network device may send information on the group categories to an administrator. In other examples, the administrator provides feedback to the network device to perform load balancing between the sessions from the two categorized group types. Performing load balancing can increase performance of transmitting information between the client device and the server, and decrease traffic of data flowing between the client device and the server. Performing load balancing may prevent malfunctions or malware from occurring. The load balancing may comprise staggering a transmission of frames or packets within sessions such that at any given interval of time, a total amount of traffic transmitted across all the session is within a threshold amount of traffic.

At step 520, the hardware processor(s) 502 may execute machine-readable/machine-executable instructions stored in the machine-readable storage media 504 to analyze a particular session, following the grouping of sessions and load balancing. The hardware processor(s) 502 may determine if a session is a long-lived session type. The network device may read and obtain the statistic generation information of session from the cache. The statistic generation information of a session can include a time duration, minimum duration, maximum duration, mean duration, standard deviation of durations, and type categorization.

At step 522, the hardware processor(s) 502 may execute machine-readable/machine-executable instructions stored in the machine-readable storage media 504 to send an alert to the administrator if a session categorized as a long-lived session type has a session time duration that is two times (2×) greater than the mean duration of the session. A network device may read and obtain the statistic generation information of session from the cache. The network device may analyze the statistic generation information of the session. If the network device analyzes and determines from the statistic generation information of a session that is a long-lived session type that the session duration of the session is two times (2×) greater than the mean duration of the session, the network device may send an alert to the administrator. The alert may comprise of a message to notify the administrator of an issue or risk. The administrator may provide feedback in response to the alert wherein the feedback provides the network device with instructions to resolve the issue or risk. In some examples, the alert to the administrator can prevent malfunctions and malware in the communication between the client device and the server.

In some examples, the statistic generation information of one or more sessions of the session operation is monitored and analyzed by the network device. The network device may analyze the statistic generation information to determine a performance on the transmittance of information between the client device and the server in the client-server communication. In some examples, the statistic generation information of the session time duration, minimum duration, the maximum duration, the mean duration, and the standard deviation of durations of a session of the session operation is monitored and analyzed to determine if there are any issues or risks in the client-server communication. If an issue or risk is determined, the network device may send an alert to the administrator.

At step 524, the hardware processor(s) 502 may execute machine-readable/machine-executable instructions stored in the machine-readable storage media 504 to send an alert to the administrator if a session categorized as a short-lived session type has a session time duration that is two times (2×) less than the mean duration of the session. A network device may read and obtain the statistic generation information of session from the cache. The network device may analyze the statistic generation information of the session. If the network device analyzes and determines from the statistic generation information of a session that is a short-lived session type that the session duration of the session is two times (2×) less than the mean duration of the session, the network device may send an alert to the administrator. The alert may comprise of a message to notify the administrator of an issue or risk. The administrator may provide feedback in response to the alert wherein the feedback provides the network device with instructions to resolve the issue or risk. In some examples, the alert to the administrator can prevent malfunctions and malware in the communication between the client device and the server.

At step 526, the hardware processor(s) 502 may execute machine-readable/machine-executable instructions stored in the machine-readable storage media 504 to analyze the frequency of sessions based on the statistic generation information a plurality of sessions. A network device may read and obtain the statistic generation information of session from the cache. The network device can be a router or a switch. The cache used to store the statistic generation information may be associated with or embedded in the network device. The network device may monitor and analyze the statistic generation information of the session of session frequency, mean session frequency, and type categorization of one or more sessions of the session operation. Monitoring and analyzing the statistic generation information of the one or more sessions of the session operation can determine a performance of transmitting information between the client device and the server. In some examples, the statistic generation information of the session frequency, mean session frequency, and type categorization of one or more sessions of the session operation is monitored and analyzed to determine if an alert should be sent to the administrator.

The cache of statistic generation information of the session operation can be read by the network device. In some examples, the network device can be a router or a switch. The network device can be monitored by an administrator. The administrator may provide the network device with feedback based on the statistic generation information stored in the cache. When an anomalous behavior is detected, the network device may send alerts to an administrator to provide notification of anomalous behavior. The administrator may provide feedback in response to the alerts to resolve the anomalous behavior. For example, if the administrative module receives an alert regarding a congestion of traffic flow data in the client-server communication, then the administrative module may send a feedback to the network device to perform load balancing.

At step 528, the hardware processor(s) 502 may execute machine-readable/machine-executable instructions stored in the machine-readable storage media 504 to send an alert to the administrator if the session frequency is determined to be two times (2×) greater than the mean session frequency between a plurality of sessions. A network device may read and obtain the one or more statistic generation information of one or more sessions from the cache. The network device may analyze a plurality of statistic generation information of a plurality of sessions that are of the same categorization type. If the network device analyzes the statistic generation information of a plurality of sessions that are a short-lived session type, and determines from the statistic generation information that the session frequency of the plurality of short-lived type sessions is two times (2×) greater than the mean session frequency of the plurality of short-lived type sessions, the network device may send an alert to the administrator. If the network device analyzes the statistic generation information of a plurality of sessions that are a long-lived session type, and determines from the statistic generation information that the session frequency of the plurality of long-lived type sessions is two times (2×) greater than the mean session frequency of the plurality of long-lived type sessions, the network device may send an alert to the administrator.

The alert may include a message to notify the administrator of an issue or risk. The administrator may provide feedback in response to the alert wherein the feedback provides the network device with instructions to resolve the issue or risk. In some examples, the alert to the administrator can prevent malfunctions and malware in the communication between the client device and the server.

Subsequently, the hardware processors may obtain subsequent entries from the cache and repeat the aforementioned steps for each of the subsequent entries, until analysis of all entries have been completed.

Figure 6:
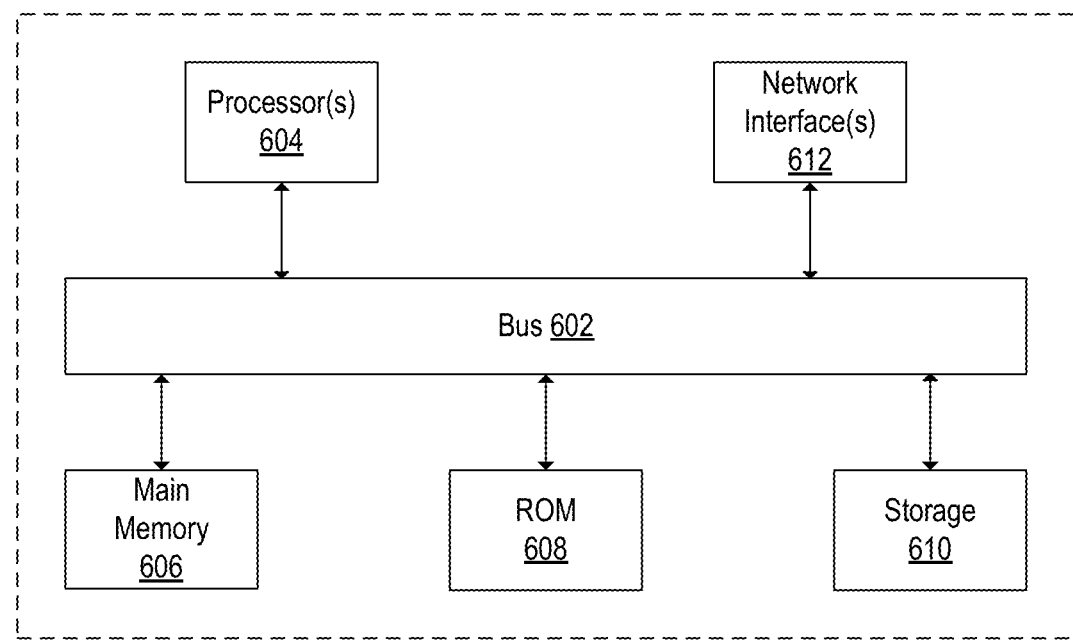
FIG. 6 illustrates a block diagram of an example computer system in which various examples of the present disclosure may be implemented.

FIG. 6 illustrates a block diagram of an example computer system in which various examples of the present disclosure may be implemented. The computer system 600 can include a bus 602 or other communication mechanism for communicating information, one or more hardware processors 604 coupled with the bus 602 for processing information. The hardware processor(s) 604 may be, for example, one or more general purpose microprocessors. The computer system 600 may be an example of a client-server communication or similar device.

The computer system 600 can also include a main memory 606, such as a random access memory (RAM), cache and/or other dynamic storage devices, coupled to the bus 602 for storing information and instructions to be executed by the hardware processor(s) 604. The main memory 606 may also be used for storing temporary variables or other intermediate information during execution of instructions by the hardware processor(s) 604. Such instructions, when stored in a storage media accessible to the hardware processor(s) 604, render the computer system 600 into a special-purpose machine that can be customized to perform the operations specified in the instructions.

The computer system 600 can further include a read only memory (ROM) 608 or other static storage device coupled to the bus 602 for storing static information and instructions for the hardware processor(s) 604. A storage device 610, such as a magnetic disk, optical disk, or USB thumb drive (Flash drive), etc., can be provided and coupled to the bus 602 for storing information and instructions.

Computer system 600 can further include at least one network interface 612, such as a network interface controller module (NIC), network adapter, or the like, or a combination thereof, coupled to the bus 602 for connecting the computer system 600 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 600, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques or technology described herein using customized hard-wired logic, one or more ASICs or FPGAs, firmware and/or program logic which in combination with the computer system 600 that causes or programs the computer system 600 to be a special-purpose machine. According to one or more examples, the techniques described herein are performed by the computer system 600 in response to the hardware processor(s) 604 executing one or more sequences of one or more instructions contained in the main memory 606. Such instructions may be read into the main memory 606 from another storage medium, such as the storage device 610. Execution of the sequences of instructions contained in the main memory 606 can cause the hardware processor(s) 604 to perform process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 610. The volatile media can include dynamic memory, such as the main memory 606. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 402. The transmission media can also take a form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing system that comprises a network, a network device, a client, and a server, the computing system further comprising:
   receive session information associated with a session;
   record the session information;
   determine a type of the session, wherein:
     the type of the session is long-lived if the session time duration is greater than a duration threshold; or
     the type of the session is short-lived;
   categorize the session into a session group of session groups based on the session information;
   analyze the session information based on the categorized session group of the session;
   determine a frequency of short-lived sessions within a set period;

determine a frequency of long-lived sessions with a set period;
determine a mean frequency based on the frequency of short-lived sessions and the frequency of long-lived sessions;
determine anomalous behavior between the sessions in a session group; and
send an alert of the determined anomalous behavior
perform load balancing on the session based on the analysis and categorization of the session, wherein the load balancing comprises staggering a transmission of frames or packets within sessions such that at any given interval of time, a total amount of traffic transmitted across all the session is within a threshold amount of traffic.

2. The computing system of claim 1, wherein the session information comprises a source IP, destination IP, source port, destination port, session start time, session time duration, session count, and length of frame of the session information.

3. The computing system of claim 1, further comprising:
rank the short-lived and the long-lived sessions for load balancing.

4. The computing system of claim 1, wherein the determining anomalous behavior between the sessions in a session group further comprises:
determine that the frequency of short-lived sessions is at least two times greater than the mean frequency; and
determine that the frequency of long-lived sessions is at least two times less than the mean frequency.

5. The computing system of claim 1, wherein the analyzing the session information further comprises:
compare session information of a plurality of sessions in the categorized session group;
determine, based on the compared session information, anomalous behavior between the sessions in the categorized session group; and
send an alert of the determined anomalous behavior.

* * * * *